United States Patent
Gäbel et al.

(10) Patent No.: US 12,254,292 B2
(45) Date of Patent: Mar. 18, 2025

(54) ENGINEERING STATION AND METHOD FOR DIAGNOSING A USER PROGRAM

(71) Applicant: Siemens Aktiengesellschaft, Munich (DE)

(72) Inventors: Kai Gäbel, Chemnitz (DE); Wolfgang Horn, Hohenstein-Ernstthal (DE); Piotr Jarosz, Chemnitz (DE); Thomas Scherf, Lichtenau (DE); Sven Schneider, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 136 days.

(21) Appl. No.: 18/313,490

(22) Filed: May 8, 2023

(65) Prior Publication Data
US 2023/0367558 A1    Nov. 16, 2023

(30) Foreign Application Priority Data
May 10, 2022  (EP) ..................... 22172424

(51) Int. Cl.
*G06F 8/34* (2018.01)
*G06F 8/33* (2018.01)

(52) U.S. Cl.
CPC . *G06F 8/34* (2013.01); *G06F 8/33* (2013.01)

(58) Field of Classification Search
CPC ..................... G06F 8/33; G06F 8/34
See application file for complete search history.

(56) References Cited

U.S. PATENT DOCUMENTS

| | | | | |
|---|---|---|---|---|
| 8,244,386 | B2* | 8/2012 | Gray | G05B 19/4061 700/181 |
| 8,589,122 | B2* | 11/2013 | Nagatsuka | G05B 19/4069 703/2 |
| 8,594,814 | B2* | 11/2013 | Rovaglio | G06F 3/011 715/848 |
| 10,406,689 | B2* | 9/2019 | Takeda | B25J 9/1671 |
| 10,481,885 | B2* | 11/2019 | Lönnemark | G06F 8/52 |
| 10,620,917 | B2* | 4/2020 | McDaniel | G06F 8/35 |
| 11,638,994 | B2* | 5/2023 | Mcgregor | G06F 30/20 703/7 |

(Continued)

FOREIGN PATENT DOCUMENTS

| | | |
|---|---|---|
| EP | 3367192 | 8/2018 |
| EP | 3819730 | 5/2021 |

*Primary Examiner* — Douglas M Slachta
(74) *Attorney, Agent, or Firm* — Cozen O'Connor

(57) ABSTRACT

A method for diagnosing a user program for controlling movement and positioning tasks of drives operated to execute a movement path of an apparatus, wherein the apparatus and movement path are depicted as a three-dimensional view in a first output element, to depict the movement path, a graphic element formed as a polygonal chain is generated for movement sections, which is operated in a force sensitive manner so that a user can select a location on the polygonal chain with a pointer device and obtain a display of an output field with a line of code that has the program instruction that is responsible through the execution for reaching the location within the movement section of the apparatus or position vector, and a recording method was performed in which the current position vector and the associated line of code or a code line index are recorded at sampling time points.

14 Claims, 5 Drawing Sheets

(56) References Cited

U.S. PATENT DOCUMENTS

| | | | |
|---|---|---|---|
| 2009/0058803 A1* | 3/2009 | Pasolini | G06F 3/0383 |
| | | | 345/157 |
| 2017/0193137 A1* | 7/2017 | Li | G06F 17/16 |
| 2018/0260503 A1* | 9/2018 | Dweik | G06N 7/023 |
| 2019/0026400 A1* | 1/2019 | Fuscoe | G06F 30/13 |
| 2019/0311079 A1* | 10/2019 | Moriya | B25J 13/00 |
| 2023/0153486 A1* | 5/2023 | Ohnuki | G06F 30/20 |
| | | | 703/7 |

* cited by examiner

| nT | Pn (TCP) (x, y, z) | ( A1, A2, A3 ) | v | a | j | In | CZk |
|---|---|---|---|---|---|---|---|
| | 0.0, 0.0, 20.0 | 90.0, 90.0, 90.0 | 0.0 | 10.0 | 100.0 | 320 | 1 |
| | 2.0, 3.0, 20.0 | 88.0, 89.0, 87.0 | 10.0 | 0.0 | 0.0 | 321 | 1 |
| | 3.0, 6.0, 20.0 | 86.0, 88.0, 82.0 | 10.0 | 0.0 | 0.0 | 322 | 2 |
| | 10.0, 10.0, 25.0 | 82.0, 90.0, 60.0 | 10.0 | 0.0 | 0.0 | 323 | 3 |
| | 20.0, 18.0, 25.0 | 75.0, 95.0, 45.0 | 15.0 | 5.0 | 50.0 | 324 | 4 |
| | 30.0, 23.0, 20.0 | 75.0, 105.0, 45.0 | 15.0 | 0.0 | 0.0 | 325 | 4 |
| | 100.0, 18.0, 199.0 | 75.0, 150.0, 45.0 | 33.0 | 18.0 | 200.0 | 326 | 4 |
| | 150.0, 12.0, 500.0 | 80.0, 180.0, 45.0 | 100.0 | 67.0 | 400.0 | 327 | 5 |

ENGINEERING STATION AND METHOD FOR DIAGNOSING A USER PROGRAM

BACKGROUND OF THE INVENTION

1. Field of the Invention

The invention relates to a method for diagnosing a user program for controlling movement and positioning tasks of a plurality of drives that are operated to execute a movement path of an apparatus, where the user program triggers individual movement sections of the apparatus by executing program instructions, where the program instructions are implemented as lines of code in a text-based program editor, and where the apparatus with its movement path is depicted as a three-dimensional view in a first output element.

The invention also relates to an engineering station for diagnosing a user program for controlling movement and positioning tasks of a plurality of drives that are operated to execute a movement path of an apparatus, where the engineering station comprises a text-based program editor, a first output element configured to depict the apparatus and its movement path as a three-dimensional view, where the user program has lines of code with program instructions, and where the program instructions trigger movement sections of the apparatus via an automation component.

2. Description of the Related Art

For programming, for example, movement functionalities (e.g., robot programming or CNC programming), a movement path or trajectory is specified by movement instructions in a suitable programming language for a controller. Herein, the movement is programmed with either an absolute or a relative position specification, as required. Moreover, the position specifications can refer to different coordinate systems. This diversity makes it necessary to manually commission the program in question for the movement instructions in order to be able ultimately to ensure desired functions in the machine.

SUMMARY OF THE INVENTION

It is an object of the present invention to provide a method for facilitating commissioning of an apparatus, in particular robots or machine tools, for a commissioning engineer.

This and other objects and advantages are achieved in accordance with the invention by a method in which a user program is executed and, herein, on the one hand, a position vector of the movement path and, on the other hand, a code line index of the line of code executed at this sampling time point are recorded in a time-discrete manner at sampling time points, where the position vector and the code line index are entered as a pair of values in a first assignment table at the respective sampling time points, and where in order to depict the movement path, a graphic element formed as a polygonal chain is generated for the movement section. Here, the graphic element is linked to the assignment table. In addition, in order to depict the movement path, the polygonal chain is superimposed on the first output element, where the graphic element is operated in a force sensitive manner so that a user selects a location on the polygonal chain with a pointer device and obtains a display of an output field with a line of code, and where the displayed line of code has the program instruction, which is responsible through the execution for reaching the selected location within the movement section of the apparatus or the position vector.

User programs are used to configure and program controllers for motors or axes or to configure and program an automation component, where it is important to ascertain the optimum parameters for the respective application when commissioning the apparatus or a positioning system. As a rule, such programs for configuring user programs on controllers have a graphical user interface and can be operated intuitively. In addition, a powerful text-based program input editor is also available, particularly for experts. An overview of program lines is rapidly lost in these powerful text-based input editors. As result, it is advantageous, for example, by pointing with a mouse at a trace or the depicted movement path, for a commissioning engineer to be given an indication of which program line or which program instruction is responsible for reaching this location.

It is also advantageous if a tool center point of the apparatus with an x-coordinate and a y-coordinate for two-dimensional kinematics or an x-coordinate, a y-coordinate and a z-coordinate for three-dimensional kinematics is used as a position vector. A tool center point is the point at which all positioning tasks of the apparatus can be defined.

To further facilitate commissioning, in addition a path-time diagram of the apparatus is depicted in a second output element, where the path-time diagram is operated in a force sensitive manner so that a user selects a time point with a pointer device and obtains a display of a further output field with a line of code, and where the displayed line of code has the program instruction that is responsible through the execution at this time point. To depict the time in the path-time diagram, in addition a signal, such as an acceleration, a velocity or a joint axis, is recorded.

In accordance with the invention, furthermore, the programming, 3D depiction and path-time diagram are combined to form a common view. The 3D depiction visualizes a model of the apparatus, in this case kinematics of a robot or a machine tool or in particular a delta picker, and a movement path or trajectory of the movement in the form of a trace resulting from the movement programs or user programs. Individual commissioning steps can be further improved if the program editor is operated in a step mode based on the recordings in the assignment table and a single program instruction is executed by manual input and the movement section associated with these program instructions is visually highlighted in the polygonal chain.

If the focus is not on the temporal profile of the movement, but on the course of the program sequence, then the individual instructions can be controlled in this type of step mode and the program depiction can depict the resulting movement steps in the 3D view and/or in the path-time diagram.

In a further advantageous embodiment of the method, the program editor and the first output element for the three-dimensional view interact with one another such that a selection of a location on the polygonal chain by the user with a pointer device causes the program editor to be switched into focus and the line of code corresponding to the movement section of the selected location to be visually highlighted, where the corresponding program instruction in the visually highlighted line of code is visually highlighted again in a different way.

For pre-commissioning, it is advantageous for a simulation of the user program to be performed based on the recording in the assignment table and for a user to test the movement path with the three-dimensional view in the first output element without any hardware that actually exists being present. With such a functionality, which would, for example, be integrated in an engineering system, a user could now simulate and try out the user software using virtual testing—without any connected hardware. For example, the user can optimize program parts at an early storage in one of the first development phases for the operation of the apparatus.

The objects and advantages in accordance with invention are also achieved by an engineering station having an execution device that is configured to execute the user program and, herein, to record in a time-discrete manner at sampling time points, on the one hand, a position vector of the movement path and, on the other hand, a code line index of the line of code executed at this sampling time point in an assignment table as a pair of values. The first output element is furthermore configured to depict the movement path as a graphic element in the form of a polygonal chain for the movement sections, where the graphic element is operable in a force sensitive manner such that a user selects a location on the polygonal chain with a pointer device and displays an output field with a line of code. The graphic element has a link to the assignment table and is furthermore configured to display the line of code having the program instruction responsible for reaching the apparatus of the movement section associated with the selected location.

Furthermore, it is advantageous, for the assignment table to have a tool center point of the apparatus with an x-coordinate, a y-coordinate and a z-coordinate as a position vector.

In a further embodiment of the engineering station, a second output element is provided for depicting a path-time diagram of the apparatus, where the path-time diagram is operable in a force sensitive manner so that a user selects a time point with a pointer device and obtains a display of a further output field with a line of code, where the displayed line of code shows the program instruction that is executed at the selected time point, and where the path-time diagram has a further link to the assignment table as a further graphic element.

In particular for troubleshooting, the execution device and the program editor of the engineering station are configured to execute individual program instructions step-by-step in a step mode by manual input, where the graphic element is configured to visually highlight the movement section associated with the respective step in the polygonal chain.

In a further embodiment, for the three-dimensional view, the program editor and the first output element are configured such that the selection of a location on the polygonal chain by the user with a pointer device causes the program editor to be switched into focus and the line of code corresponding to the movement section of the selected location to be visually highlighted in the program editor. Furthermore, the program editor is configured to visually highlight the corresponding program instruction in the visually highlighted line of code again in a different way.

In a further embodiment of the engineering station, a simulator is configured to perform a simulation of the user program, where the first output element is configured to enable the user to test the movement path with the three-dimensional view without any hardware that actually exists being present. The simulated movement or the simulated movement path is then likewise depicted in the three-dimensional view as a trace. The resulting recording can also be saved and replayed offline if required.

BRIEF DESCRIPTION OF THE DRAWINGS

The drawing shows an exemplary embodiment of the invention. In which.

DETAILED DESCRIPTION OF THE EXEMPLARY EMBODIMENTS

Figure 1:
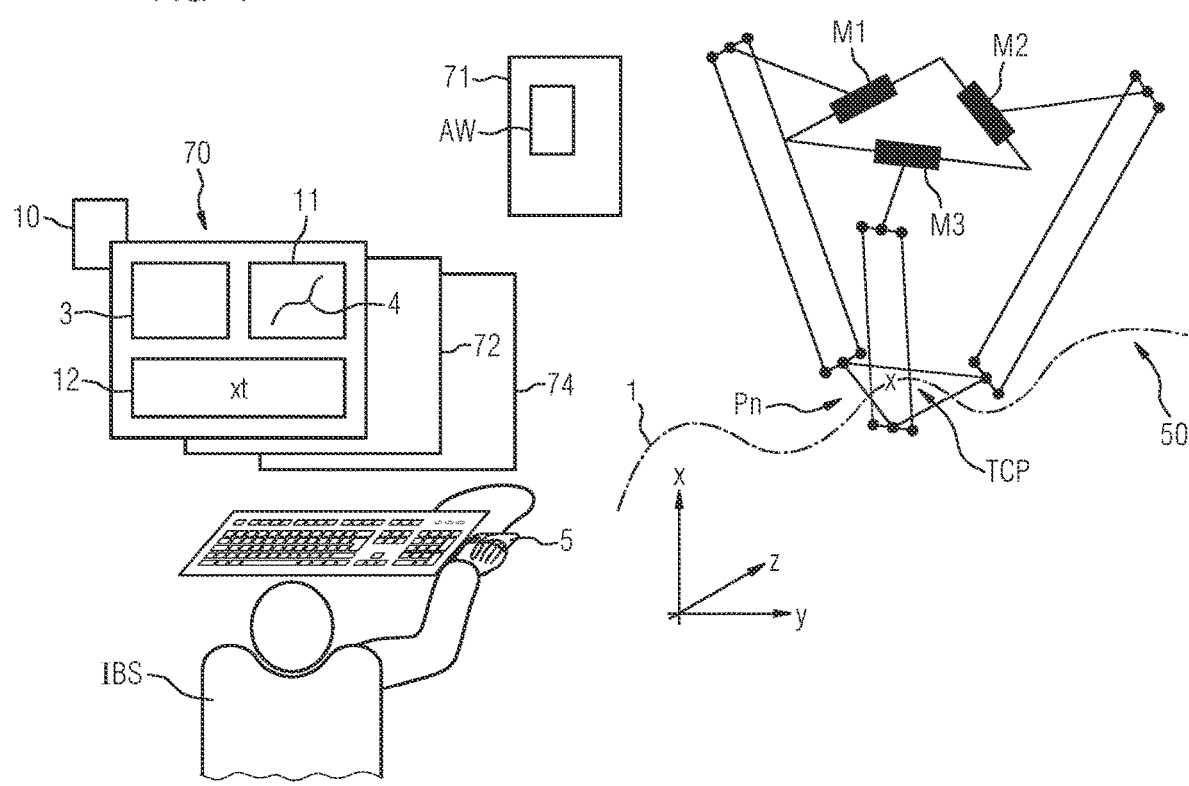
FIG. 1 is a schematic illustration of an engineering station for controlling and diagnosing an apparatus in accordance with the invention.

FIG. 1 depicts an engineering station 70 for diagnosing a user program AW for controlling movement and positioning tasks of a first drive M1, a second drive M2 and a third drive M3. The drives M1,M2,M3 are part of an apparatus 50, which is, for example, formed as a delta picker. The apparatus 50 has a tool center point TCP which, in this case, is equivalent to a position vector Pn. The tool center point TCP is guided along a movement path 1 via the user program AW. The user program AW runs later in real operation in an automation component 71. The automation component 71 is configured to actuate the drives M1,M2,M3 via corresponding output modules in accordance with the program instructions Bi.

To execute the movement path 1 of the apparatus 50, the user program AW comprises lines of code CZk with program instructions Bi, which in turn trigger the actuation of the drives M1,M2,M3. The engineering station 70 comprises a text-based program editor 3 and a first output element 11, where the first output element 11 is configured to depict the apparatus 50 and its movement path 1 as a three-dimensional view 3D. For this purpose, the user program AW has lines of code CZk with program instructions Bi, where the program instructions Bi are configured to trigger movement sections 2 of the apparatus 50 via the automation component 71.

An execution device 72 is configured to execute the user program AW and, herein, to record in a time-discrete manner at sampling time points nT, on the one hand, a position vector Pn of the movement path 1 and, on the other hand, a code line index In of the line of code CZK executed at this sampling time point nT in an assignment table 10 as a pair of values.

Here, it is considered to be particularly advantageous for the first output element 11 to be furthermore configured to depict the movement path 1 as a graphic element 4 in the form of a polygonal chain for the movement sections 2. Here, the graphic element 4 is operable in force sensitive manner such that a user IBS selects a location D on the polygonal chain with a pointer device 5 and displays an output field 6 with a line of code CZk, where the graphic element 4 has a link to the assignment table 10 and is furthermore configured to display the line of code CZk having the program instruction Bi responsible for reaching the apparatus 50 of the movement section 2 associated with the selected location D (cf. FIG. 3). The assignment table 10 works with the position vector Pn, which also depicts the tool center point TCP of the apparatus 50. Here, an x-coordinate x, a y-coordinate y and a z-coordinate z are used for this purpose.

Figure 3:
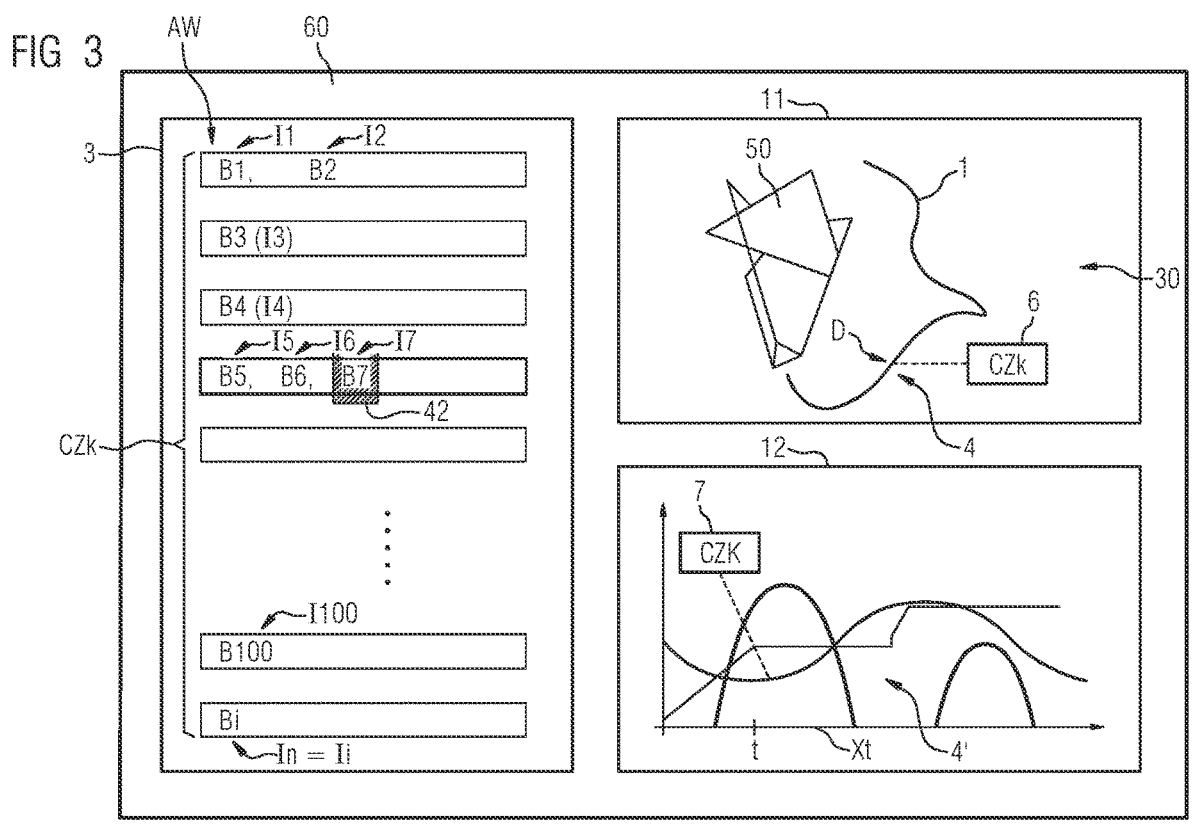
FIG. 3 shows a monitor view of the program editor and output fields in accordance with the invention.

The engineering station 70 furthermore has a second output element 12 for depicting a path-time diagram Xt of the apparatus 50, where the path-time diagram Xt is operable in a force sensitive manner so that a user IBS selects a time point t with a pointer device 5 and obtains a display of a further output field 7 with a line of code CZk (cf. FIG. 3). The displayed line of code CZk has the program instruction Bi executed at the time point t, where the path-time diagram Xt is formed as a further graphic element 4' with a further link to the assignment table 10. The engineering station 70 is furthermore configured such that the execution device 72 and the program editor 3 interact with one another such that individual program instructions Bi are executed step-by-step in a step mode by manual input, where the graphic element 4 is configured to visually highlight the movement section 2 associated with the respective step in the polygonal chain.

Figure 2:
FIG. 2 shows an assignment table from time point to program line in accordance with the invention.

FIG. 2 depicts the assignment table 10 mentioned previously with reference to FIG. 1. A first column of the assignment table 10 lists the sampling time points nT. The position vector Pn or the tool center point TCP is entered in a second column of the assignment table 10. A third column depicts machine coordinates A1,A2,A3. The velocity v of the apparatus 50 is entered in a fourth column. The acceleration a of the apparatus 50 at this time point is entered in a fifth column. A jerk j is entered in a sixth column. Finally, the associated program line or the associated code line index In is entered in the seventh and last column. Such an assignment table 10 can now be used as the basis for tracing the current position or current position vector Pn of the apparatus 50 such that that position vector Pn that must be associated with which program line or line of code CZk is now always known.

The entry v for velocity corresponds to the first derivative after the time t, the entry a for acceleration corresponds to the second derivative after the time t and the entry j for the jerk corresponds to the third derivative after the time t.

The recording with the assignment table 10 can now be played back again in the 3D depiction, where either only the tool center point TCP moves on the movement path 1 (trace) or (if the necessary machine coordinates A1,A2,A3 are available) the kinematics can also be played back. In order to visualize the assignment of the tool center point TCP on the movement path 1, which is, for example, depicted as a trace, to a cursor depicted in the path-time diagram Xt, there is a coupling via the recording point, i.e., the sampling time point nT. Due to the program processing data additionally held in the recording, i.e., the code line index In or generally the corresponding line of code CZk or even the individual program instruction Bi, it is now possible to uniquely assign the movement sections 2 of the movement path 1 and the signals in the path-time diagram Xt to the programmed instructions Bi.

Herein, an assignment can be visually distinct:

As a mark in the program editor 3 marking the current program position, as text near the tool center point TCP within the 3D depiction, by different coloring of the areas on the movement path 1 (traces with different colors), by a display showing the program line when the user moves (hovers) the mouse over the trace (in a similar manner to a tool tip).

Alternatively to the line of code CZk or the code line index In, the 3D view can also display the program instruction BI or a combination of line of code CZk, code line index In or program instruction Bi. The program instruction Bi can be depicted in shortened form in its mnemonic.

The environment of the program instruction PI (previous instruction and following instruction) can also be depicted.

The marking can be instruction-granular or based on program functions (technology functions) and then mark an area of the trace and the corresponding locations are marked in the path-time diagram xt.

In accordance with the invention, the combination of the 3D depiction, the path-time diagram xt and the program depiction in the program editor 3 enables the user to reach the corresponding program position or line of code CZk by clicking on a movement section 2 in the 3D view. In addition, the corresponding position is visually highlighted in the program editor 3. Starting from the program editor 3 and its program depiction, the trace section belonging to a program position or a code line index In and the associated xt section can be highlighted.

FIG. 3 depicts a view of a monitor 60 of an engineering station 70. The monitor view of the monitor 60 in principle shows three main depiction fields. On the one hand, the textual depiction is depicted in the program editor 3 and, on the other hand, a graphical depiction next to this depicts the 3D view of the apparatus 50 and a path-time diagram Xt of signal profiles for actuating the drives M1,M2,M3. The program editor 3 has the user program AW. The user program AW is divided into lines of code CZk. Each line of code CZk contains one or more program instructions Bi. For more precise retrieval of the corresponding program position, the program instructions Bi are additionally assigned code line indices In. The first program instruction B1 is accordingly assigned the code line index I1 and the last program instruction Bi is accordingly assigned the code line index In=Ii.

If, for example, a user IBS has now pointed the pointer device 5 (mouse) at a location D on the movement path 1 in the first output element 11, then an output field 6 is output simultaneously in the first output element 11 at the indicated location in which the associated line of code CZk is displayed. Virtually parallel to this display, the corresponding line of code CZk is visually highlighted in the program editor 3. In addition to further identification, the associated program instruction B7 is again visually highlighted by further visual highlighting 42 in the visual highlighting 41 for the line of code CZk.

The corresponding line of code CZk is also displayed in the second output element 12 depicting the path-time diagram Xt via a further output field 7 at the corresponding time point t.

Figure 4:
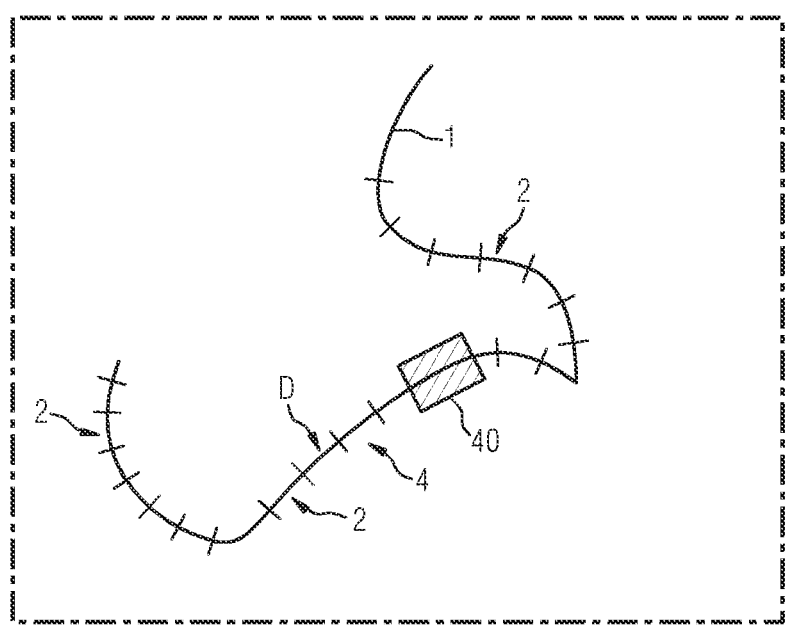
FIG. 4 shows a movement path or trajectory with individual movement sections in accordance with the invention.

FIG. 4 provides an explanation of the division of the movement path 1 into individual movement sections 2 once again. The movement path 1 performed by the apparatus 50 starts on the left and ends on the right. The entire movement path 1 is divided into individual movement sections 2. If a user IBS now points a mouse at a location D on the movement path 1, then the scenario described in FIG. 3 is depicted in the program editor 3. However, on the other hand, a certain location on the movement path 1 can also be displayed as a trace from the program editor 3 in the movement path 1 or via the graphic element 4 that forms the polygonal chain via the assignment table 10 by clicking on a line. Thus, it is, for example, possible to simulate the user program AW so that a user IBS can test the system via the first output element 11 without any hardware that actually exists being present. A corresponding visual highlighting 40 in the polygonal chain would then move on the trace in accordance with the program instruction Bi currently being processed. Accordingly, it is also possible, if the execution device 72 and the program editor 3 are embodied in this way, for individual program instructions Bi to be executed step-by-step in a step mode via manual input, the graphic element 4 is then configured to highlight the movement section 2 associated with the respective step in the movement path, where this can, for example, occur via the visual highlighting 40 in the polygonal chain.

Figure 5:
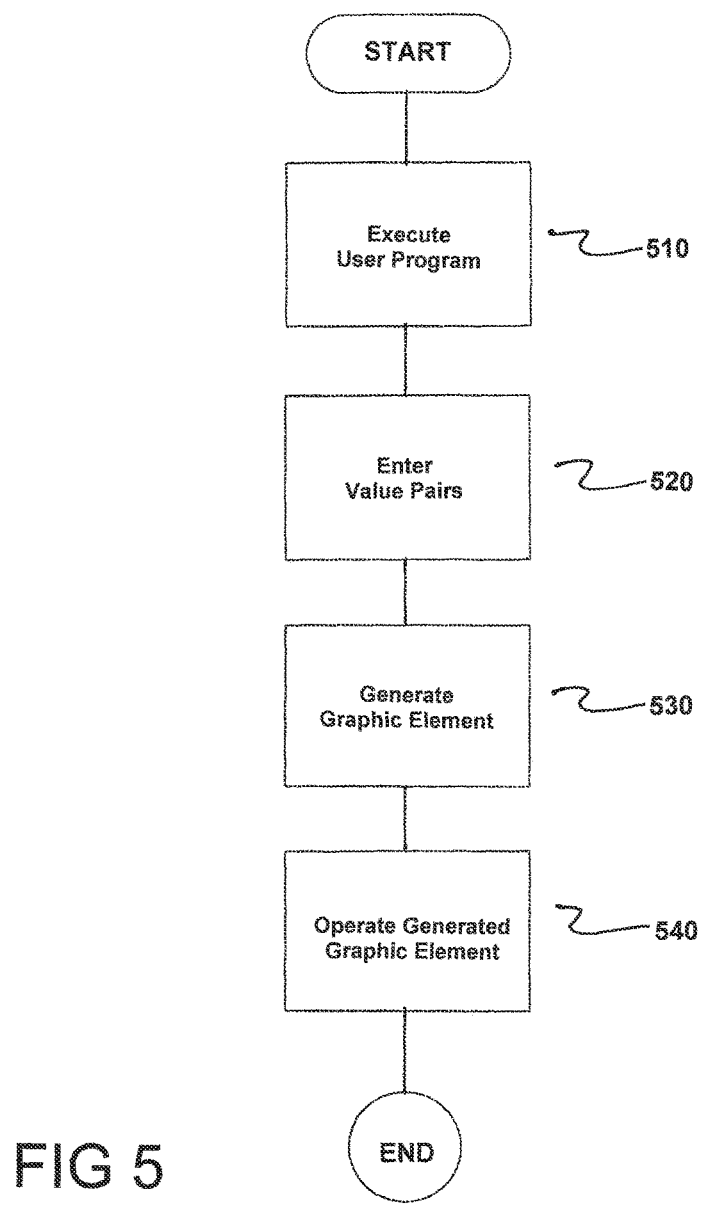
FIG. 5 is a flowchart of the method in accordance with the invention.

FIG. 5 is a flowchart of the method for diagnosing a user program AW for controlling movement and positioning tasks of a plurality of drives M that are operated to execute a movement path 1 of an apparatus 50, where the user program AW triggers individual movement sections 2 of the apparatus 50 by executing program instructions Bi that are implemented as lines of code CZk in a text-based program editor 3, and a movement path 1 of the apparatus and apparatus 50 is depicted as a three-dimensional view (3D) in a first output element 11.

The method comprises executing the user program AW, as indicated in step 510. Here, a position vector Pn of the movement path 1 and a code line index In of the line of code CZk are executed at the sampling time point nT and recorded in a time-discrete manner at sampling time points nT.

Next, the position vector Pn and the code line index In are entered as a pair of values in an assignment table 10 at respective sampling time points nT, as indicated in step 520.

Next, a graphic element 4 is generated as a polygonal chain for the individual movement sections 2 to depict the movement path 1, as indicated in step 530. Here, the graphic element 4 is linked to the assignment table 10 and the polygonal chain is superimposed on the first output element 11 to depict the movement path 1.

Next, the generated graphic element 4 is operated in a force sensitive manner such that a user IBS selects a location D with a pointer device 5 on the polygonal chain and obtains a display of an output field 6 with a line of code CZk, as indicated in step 540. In accordance with the invention, the displayed line of code CZk has a program instruction Bi that is responsible through the execution for reaching the selected location D within the movement section 2 of the apparatus or the position vector Pn.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for diagnosing a user program for controlling movement and positioning tasks of a plurality of drives which are operated to execute a movement path of an apparatus, the user program triggering individual movement sections of the apparatus by executing program instructions (Bi) which are implemented as lines of code in a text-based program editor, and a movement path of the apparatus and apparatus being depicted as a three-dimensional view in a first output element, the method comprising:

executing the user program, a position vector of the movement path and a code line index of the line of code being executed at a sampling time point and recorded in a time-discrete manner at sampling time points;

entering the position vector and the code line index as a pair of values in an assignment table at respective sampling time points;

generating a graphic element as a polygonal chain for the individual movement sections to depict the movement path, the graphic element being linked to the assignment table and the polygonal chain being superimposed on the first output element to depict the movement path; and operating the generated graphic element in a force sensitive manner such that a user selects a location with a pointer device on the polygonal chain and obtains a display of an output field with a line of code;

wherein the displayed line of code has a program instruction which is responsible through the execution for reaching the selected location within the movement section of the apparatus or the position vector.

2. The method as claimed in claim 1, wherein a tool center point of the apparatus with an x-coordinate and a y-coordinate for two-dimensional kinematics or an x-coordinate, a y-coordinate a z-coordinate for three-dimensional kinematics is used as a position vector.

3. The method as claimed in claim 1, further comprising:
depicting a path-time diagram of the apparatus in a second output element, the path-time diagram being operated in a force sensitive manner such that the user selects a time point with a pointer device and obtains a display of a further output field with a line of code;

wherein the displayed line of code has the program instruction, which is responsible through the execution at this time point.

4. The method as claimed in claim 2, further comprising:
depicting a path-time diagram of the apparatus in a second output element, the path-time diagram being operated in a force sensitive manner such that the user selects a time point with a pointer device and obtains a display of a further output field with a line of code;

wherein the displayed line of code has the program instruction, which is responsible through the execution at this time point.

5. The method as claimed in claim 1, wherein the program editor is operated in a step mode based on recordings in the assignment table and a single program instruction is executed by manual input and the movement section associated with this program instruction is visually highlighted in the polygonal chain.

6. The method as claimed in claim 1, wherein the program editor and the first output element for the three-dimensional view interact with one another such that the selection of a location by the user on the polygonal chain with a pointer device causes the program editor to be switched into focus and the line of code, corresponding to the movement section of the selected location to be visually highlighted; and
wherein the corresponding program instruction in the visually highlighted line of code is again visually highlighted in a different way.

7. The method as claimed in claim 1, wherein a simulation of the user program is performed based on a recording in the assignment table and the user tests the movement path with the three-dimensional view in the first output element without any hardware which actually exists being present.

8. An engineering-station for diagnosing a user program for controlling movement and positioning tasks of a plurality of drives which are operated to execute a movement path of an apparatus, the engineering-station comprising
- a text-based program editor; and
- a first output element configured to depict the apparatus and the movement path of the apparatus as a three-dimensional view;
- wherein the user program includes lines of code with program instructions which trigger movement sections of the apparatus via an automation component;
- an execution device which is configured to execute the user program and to record in a time-discrete manner at sampling time points, a position vector of the movement path (1) and a code line index of the line of code executed at a sampling time point in an assignment table as a pair of values;
- wherein the first output element is further configured to depict the movement path as a graphic element formed as a polygonal chain for the movement sections, the graphic element being operable in a force sensitive manner such that a user selects a location on the polygonal chain with a pointer device and displays an output field with a line of code, the graphic element having a link to the assignment table and being further configured to display the line of code having a program instruction responsible for reaching the apparatus of the movement section associated with the selected location.

9. The engineering station as claimed in claim 8, wherein the assignment table has a tool center point of the apparatus with an x-coordinate, a y-coordinate and a Z-coordinate as a position vector.

10. The engineering station as claimed in claim 8, further comprising:
- a second output element for depicting a path-time diagram of the apparatus, the path-time diagram being configured to be operated in a force sensitive manner so that a user selects a time point with a pointer device and obtains a display of a further output field with a line of code; and
- wherein the displayed line of code has the program instruction executed at this time point, the path-time diagram having a further link to the assignment table as a further graphic element.

11. The engineering station as claimed in claim 9, further comprising:
- a second output element for depicting a path-time diagram of the apparatus, the path-time diagram being configured to be operated in a force sensitive manner so that a user selects a time point with a pointer device and obtains a display of a further output field with a line of code; and
- wherein the displayed line of code has the program instruction executed at this time point, the path-time diagram having a further link to the assignment table as a further graphic element.

12. The engineering station as claimed in claim 8, wherein the execution device and the program editor are configured to execute individual program instructions step-by-step in a step mode by manual input; and wherein the graphic element is configured to visually highlight the movement section associated with a respective step in the polygonal chain.

13. The engineering station as claimed in claim 8, wherein, for the three-dimensional view, the program editor and the first output element are configured such that a selection of a location on the polygonal chain by the user (IBS) with a pointer device causes the program editor to be switched into focus and the line of code corresponding to the movement section of the selected location to be visually highlighted in the program editor; and
- wherein the program editor is further configured to visually highlight the corresponding program instruction in the visually highlighted line of code again in a different way.

14. The engineering station as claimed in claim 8, further comprising:
- a simulator configured to perform a simulation of the user program;
- wherein the first output element is configured to enable a user to test the movement path with the three-dimensional view, without any hardware that actually exists being present.

* * * * *